March 30, 1926.

S. W. NICHOLSON 1,578,347

VEHICLE WINDOW CONTROL MECHANISM

Filed Sept. 4, 1920    3 Sheets-Sheet 1

Inventor
STANLEY W. NICHOLSON
By Whittemore, Hulbert and Whittemore
Attorney

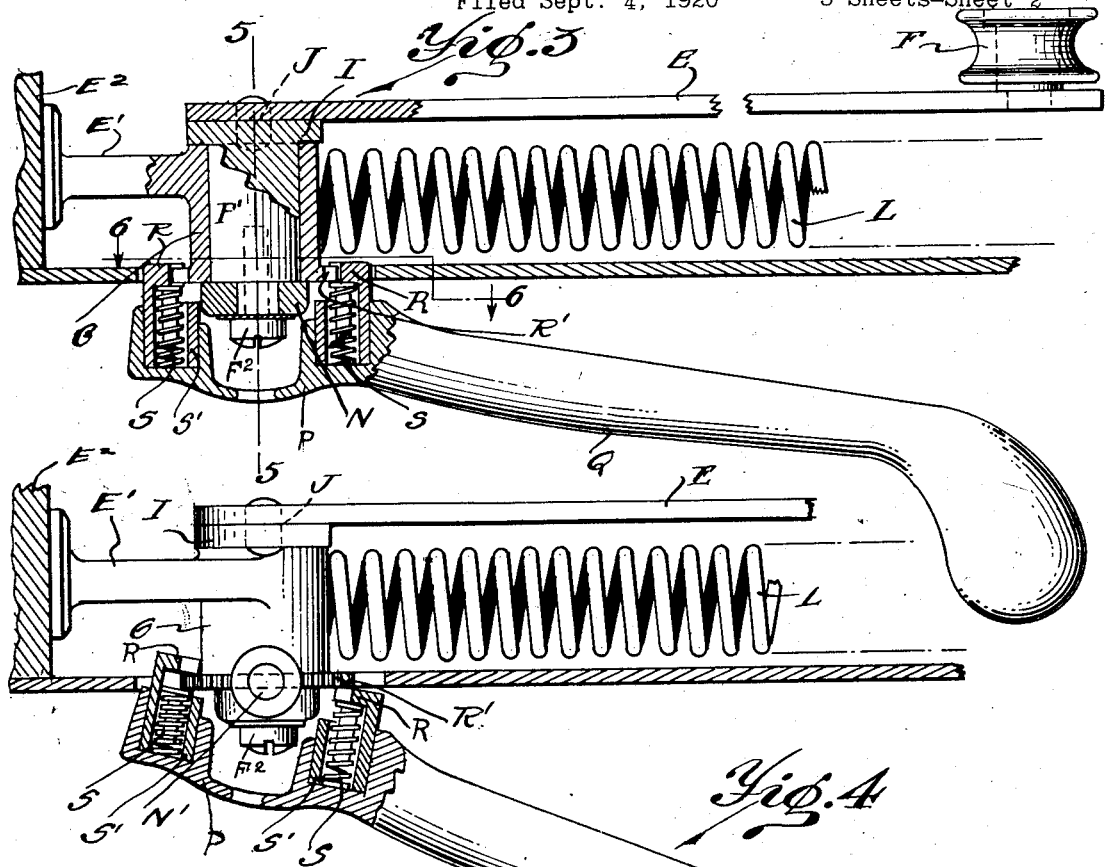
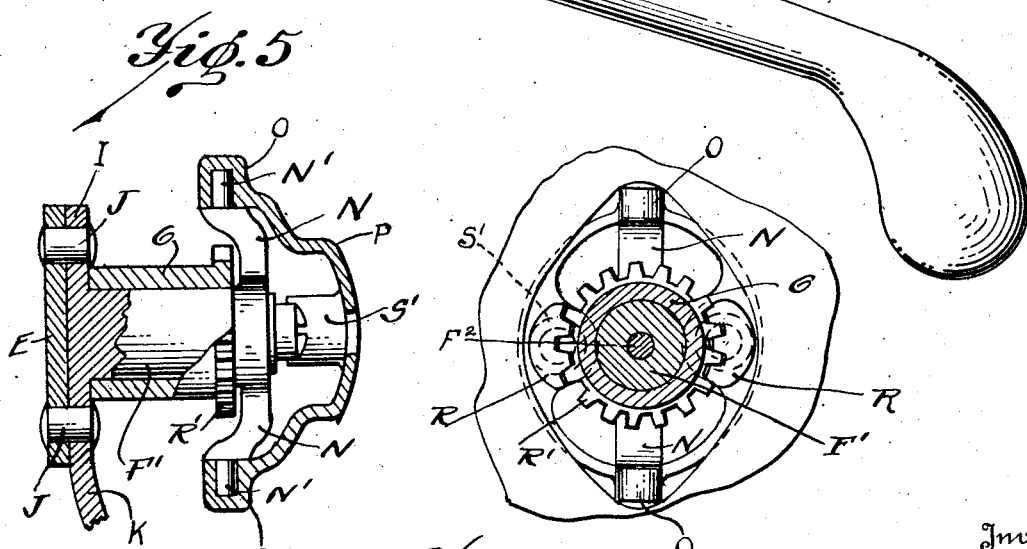

March 30, 1926.
S. W. NICHOLSON
1,578,347
VEHICLE WINDOW CONTROL MECHANISM
Filed Sept. 4, 1920    3 Sheets-Sheet 3
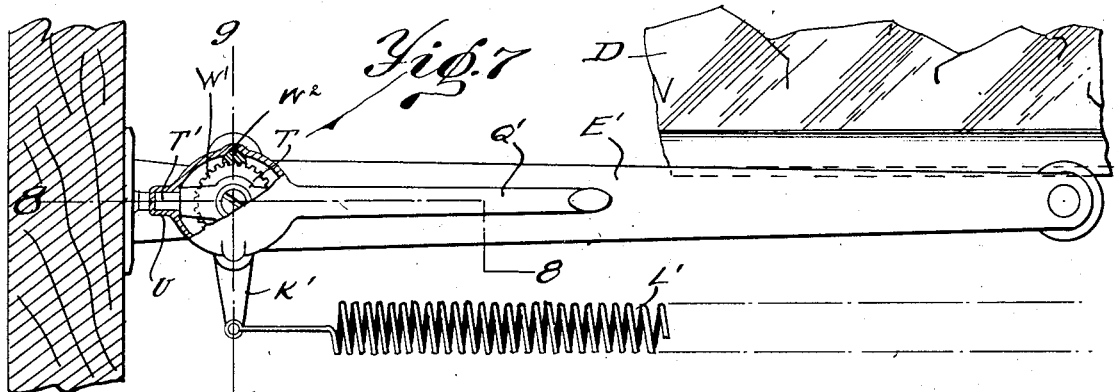
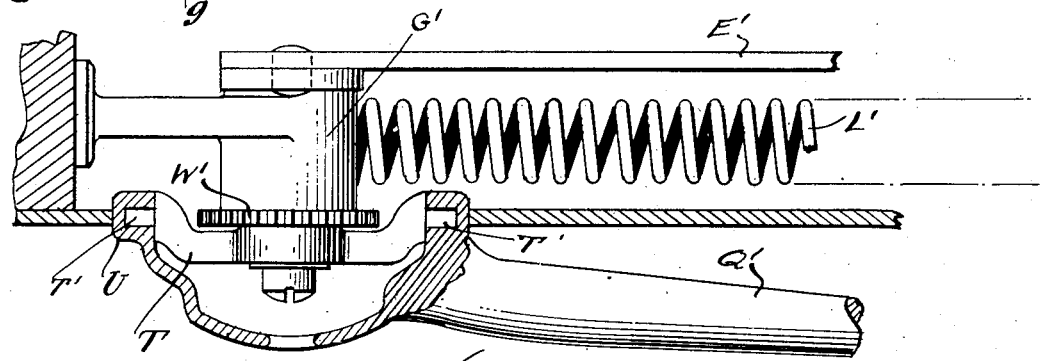
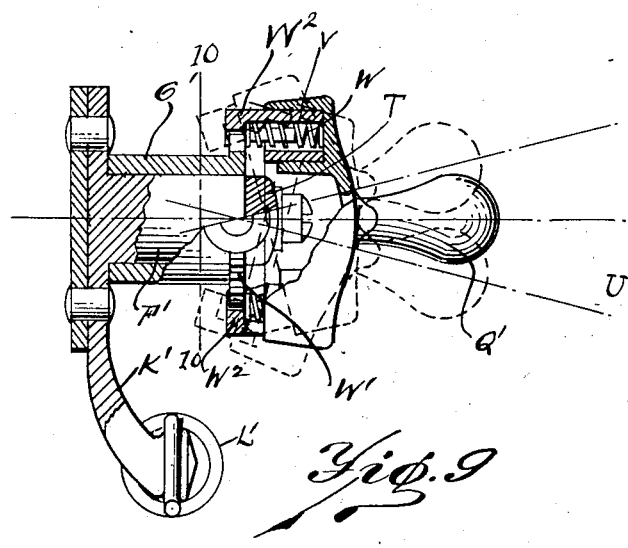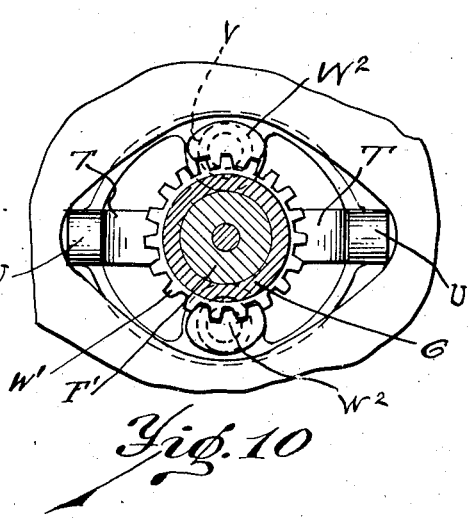
Inventor
STANLEY W. NICHOLSON.
By Whittemore, Hulbert and Whittemore
Attorney Patented Mar. 30, 1926.

1,578,347

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

VEHICLE WINDOW-CONTROL MECHANISM.

Application filed September 4, 1920. Serial No. 408,349.

*To all whom it may concern:*

Be it known that I, STANLEY W. NICHOLSON, a citizen of the United States of America, residing at Toledo, in the county of Lucas and State of Ohio, have invented certain new and useful Improvements in Vehicle Window-Control Mechanism, of which the following is a specification, reference being had therein to the accompanying drawings.

This invention relates to window control mechanisms and more particularly to control mechanisms for automobile windows.

The invention consists in the structural features and arrangement of parts hereinafter fully set forth.

In the drawings:

Figure 3 is a plan view of the same in partial section;

Figure 4 is a view similar to Figure 3 but showing the actuating handle adjusted to an unlatched position;

Figure 5 is a vertical sectional view taken on line 5—5 of Figure 3;

Figure 6 is a section taken on line 6—6 of Figure 3 showing latch forming elements;

Figure 7 is a view in side elevation and partial section of an alternative form of control mechanism;

Figure 8 is a view of the same, partly in plan and partly in horizontal section, the section being taken on line 8—8 of Figure 7;

Figure 9 is a vertical sectional view of the same, the section being taken on line 9—9 of Figure 7, the latched position of the parts being indicated in full lines and the unlatched positions thereof in dash lines;

Figure 10 is a section on line 10—10 of Figure 9.

Figure 1:
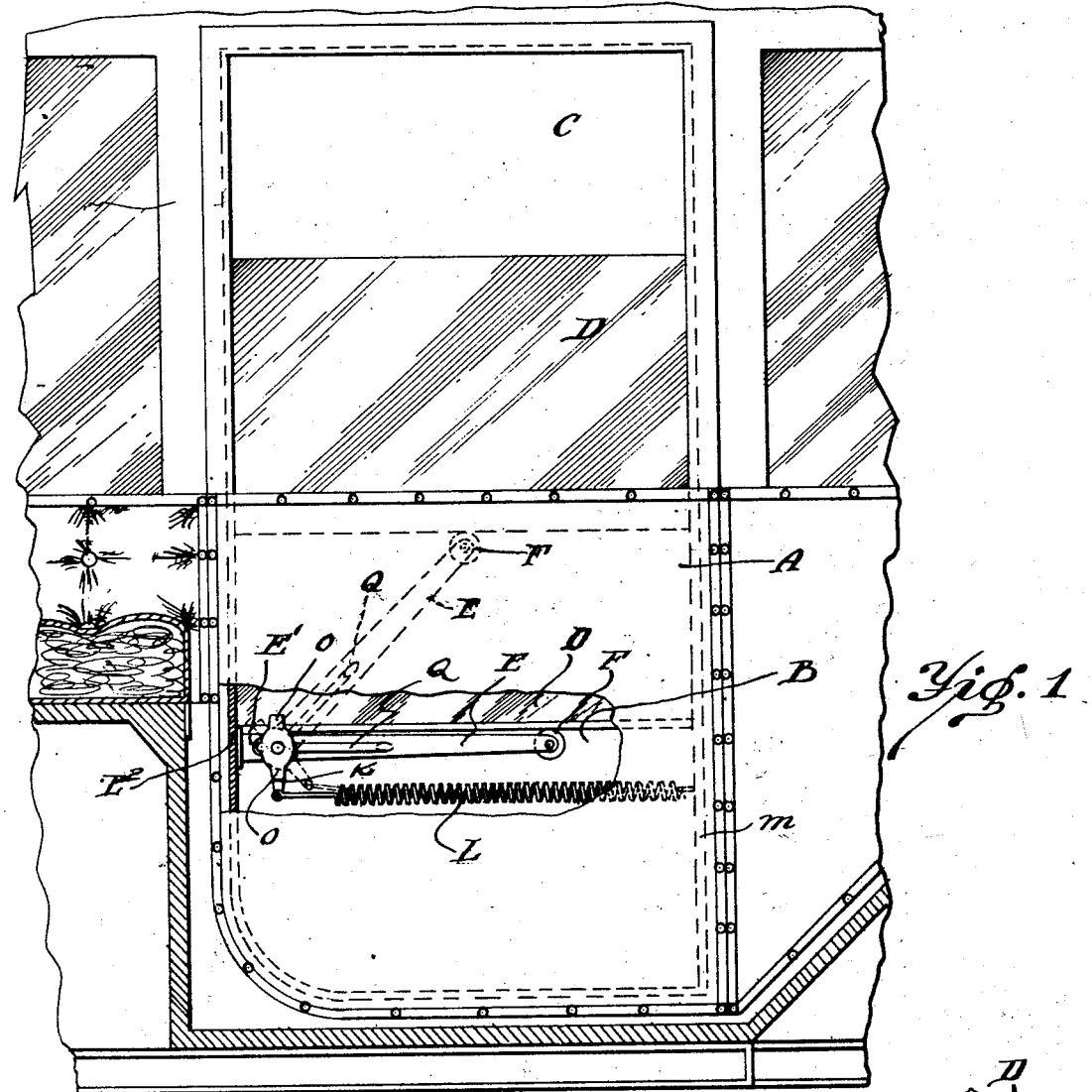
Figure 1 is an interior view of an automobile door to which the invention is applied.
Figure 2:
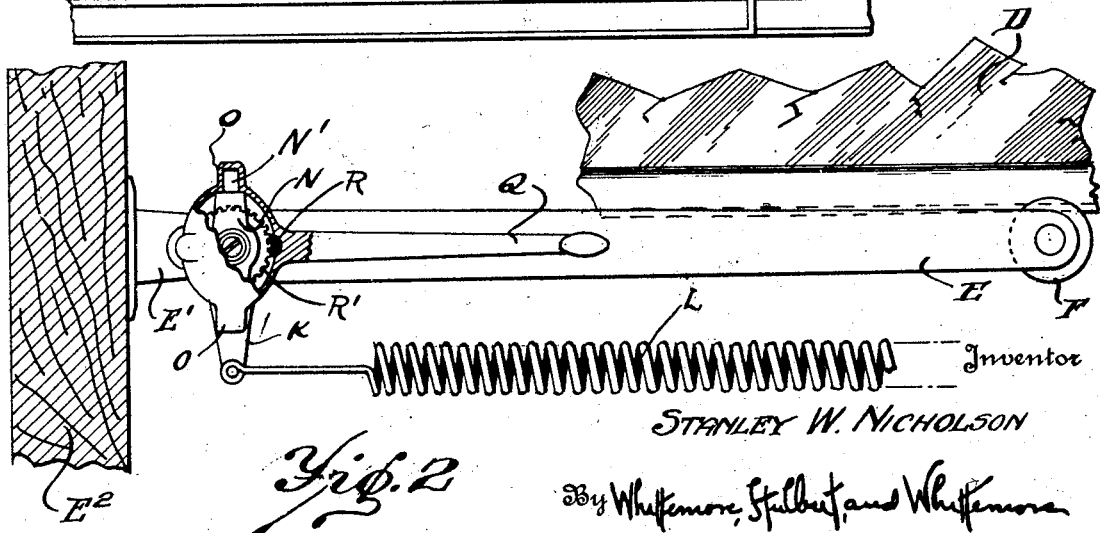
Figure 2 is an enlarged view of the control mechanism shown in Figure 1.

In these views the reference character A designates an automobile door formed in its upper portion with a window opening C and having its lower portion chambered as indicated at B. A plate of glass D forms a vertically slidable closure for the opening C and is adapted to enter the chamber B when lowered. Within the chamber B there is arranged a control mechanism for the glass D comprising a pivotal arm E carrying at its free end a roller F engaging the bottom edge of said closure. The bracket E' secured to one of the pillars E² of the door A forms a pivotal support for the arm E. F' designates the journal member of the arm E, said member engaging a bearing G formed upon the bracket E' and being provided at one end of said bearing with a flange I, to which is riveted, or otherwise rigidly secured the arm E, as indicated at J. From said flange there depends integrally an arm K, which is engaged by one end of a counterbalancing spring L extending across the chamber B, the other end of said spring being secured to the opposite pillar M of the door. At its end, opposite that carrying the arm E, there is rigidly secured to the journal member F' by a top screw F² a head N carrying diametrically exposed radial pins N'. Said pins engage in sockets O formed in a hollow hub portion P of a handle member Q for actuating the arm E. A pair of coiled springs S are mounted respectively in tubular housings S' carried by the hub portion P of the handle, one at each side of the axis of the journal member F', and secured rigidly to said hub portion by any suitable means. Said springs have their outer extremities bearing against the handle member Q and their inner ends, abutting jointly against toothed latch members R formed integral with the housings S' and against the teeth of a gear like latch member R', formed integrally upon the bearing G and normally engaged by the teeth of the latch members R.

Considering now the operation of the described construction, the latched position of the control mechanism shown in Figure 3 is normally maintained by the springs S, which through bearing jointly upon the latch members R' and R maintain the teeth of said members in locking engagement. Obviously, when such engagement exists, pivotal movement of the arm E is impossible, and the window member D is restrained, in any of its positions of adjustment from accidental movement due to vibration of the vehicle.

When it is desired to change the position of adjustment of the window member D, the handle Q is first swung inwardly from the door A, as is shown in Figure 4.

In this position the teeth R are drawn out of mesh with the latch member R', so that the handle Q may be rotated to swing the arm E about its pivotal axis and correspondingly adjust the window member. To again latch the control mechanism, it is only necessary to release the handle Q, whereupon the springs S will reestablish latch engagement between the teeth R and R'.

In the alternative form of the invention disclosed in Figures 7 to 10 inclusive, a pivotal control arm E' is mounted as has been described for engagement with the window member, F' indicating the journal portion of said control arm, G', the bearing for said journal portion, K', an arm depending from said journal portion, and L' a counterbalancing spring, all of said parts coming under the preceding description. The actuating handle Q' is in this construction, however, shifted to or from its latched position by rocking said handle upon its longitudinal axis rather than upon a transverse axis. Thus, the head T and pins T' carried thereby are substantially co-axial with the handle member Q', and the sockets U formed upon the annular member V have a similar relation to the handle. Apart from this establishment of a co-axial relation with the handle, the head T, pins T' and socket U correspond strictly to the head N, pins N' and sockets O of the first described form of the invention.

Also a pair of springs W act similarly to the springs S to normally maintain the latch engagement of gear-like latch teeth W' upon the bearing member G' and latch teeth W² upon the housings V. It is to be noted that in both forms of the invention, the pins N' or T' are offset slightly to one side of the head carrying said pins so as to locate the latter substantially in the plane of the latch teeth R' or N', this being essential to insure a simultaneous rocking of the opposed pairs of teeth R or W² out of engagement with the latch members R' or W'.

What I claim as my invention is:

1. In a window control mechanism, the combination of a bracket providing a journal bearing for the control arm of the control mechanism, a gear member carried by said bracket, an actuating member for the arm pivoted to the latter upon an axis transverse of the pivot axis of the arm, gear teeth provided upon the actuating member diametrically opposed with relation to the two intersecting pivotal axes, and spring means normally rocking the actuating member to a position engaging the gear teeth thereof with those on said bracket member, said actuating member being rockable to disengage said teeth and being thereupon actuable to shift the arm.

2. In a vehicle window control mechanism the combination of a journal member carried by the pivotal control arm of the control mechanism, a bearing engaged by said journal, a gear member fixed upon said bearing co-axial therewith, a head carried by said journal member having a pair of opposed radial pins substantially in the plane of said gear and establishing an axis transversely intersecting that of said journal member, a handle member for actuating the control arm having sockets engaging said pins and having interlocking engagement with said gear in one position thereof, and spring means normally maintaining said position of said handle member.

3. In a window control mechanism, the combination with a sliding window member, of a pivotal control arm for said member, an actuating handle for said control arm pivoted to rock upon an axis transverse to that of said arm, a fixed locking member and means establishing locking engagement of said handle with said fixed member at opposite sides of the pivotal axis of the handle.

4. In a window control mechanism, the combination of a journal member for the control arm of the control mechanism, a stationary annular locking member coaxial with said journal member, a head upon said journal member projecting outwardly beyond said locking member, and having diametrically opposed portions offset to locate the same substantially in the plane of said locking member, a handle member for actuating the control arm, and a pivotal connection between said handle member and the offset portions of said head whereby the axis of said pivotal connection is disposed in the plane of the locking member and is transverse to the axis of the journal member.

5. In a vehicle window control mechanism, the combination of a journal member for the pivotal control arm of the control mechanism, an actuating member for the control arm, a pivotal connection between said actuating member and the journal member, the axis of said connection being transverse to that of the journal member, a stationary locking member engageable by said actuating member in various rotative positions of the journal member and disengaged thereby in one limiting position of adjustment of the actuating member about said pivotal connection, and a pair of springs compressed between said stationary locking member and the actuating member carried by the latter at opposite sides of the axis of the journal member for normally establishing the actuating member in locking engagement with the locking member.

6. In a window control mechanism, the combination of an actuating handle for the arm of the control mechanism, a pivot mounting for the arm having a stationary set of teeth centered in the pivotal axis of the arm, and means connected to the arm and engageable between said teeth in various positions of the arm for holding the arm stationary, said means being releasable upon movement of said handle in a direction transverse to that of the arm.

7. In a window control mechanism, the combination of an actuating handle for the arm of the control mechanism, said handle being pivoted to rock upon an axis transverse to the longitudinal axis of said handle and transverse to the pivotal axis of the arm, and locking means for the arm upon opposite sides of the handle pivot and releasable by rocking of the handle upon its pivot.

8. In a window control mechanism, the combination of an actuating handle for the arm of the control mechanism, a mounting for the arm, locking teeth on said mounting, coacting locking means on said handle, the latter being rockable about its longitudinal axis to release said locking means, and a spring carried by the handle normally establishing its locking position.

In testimony whereof I affix my signature.

STANLEY W. NICHOLSON.